United States Patent
Karaoguz et al.

(10) Patent No.: US 7,584,359 B2
(45) Date of Patent: Sep. 1, 2009

(54) SECURE MEDIA PERIPHERAL ASSOCIATION IN A MEDIA EXCHANGE NETWORK

(75) Inventors: Jeyhan Karaoguz, Irvine, CA (US); James Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 845 days.

(21) Appl. No.: 10/675,652

(22) Filed: Sep. 30, 2003

(65) Prior Publication Data

US 2004/0117650 A1 Jun. 17, 2004

Related U.S. Application Data

(60) Provisional application No. 60/432,472, filed on Dec. 11, 2002, provisional application No. 60/443,894, filed on Jan. 30, 2003, provisional application No. 60/457,179, filed on Mar. 25, 2003, provisional application No. 60/461,717, filed on Apr. 10, 2003.

(51) Int. Cl.
*H04L 29/06* (2006.01)
*G06F 9/00* (2006.01)

(52) U.S. Cl. .................................... 713/173; 726/19
(58) Field of Classification Search ............. 713/173
See application file for complete search history.

(56) References Cited

U.S. PATENT DOCUMENTS

| | | | | |
|---|---|---|---|---|
| 5,805,803 | A * | 9/1998 | Birrell et al. ............... | 726/12 |
| 6,367,019 | B1 * | 4/2002 | Ansell et al. ............... | 726/26 |
| 6,822,971 | B1 * | 11/2004 | Mikkonen ............... | 370/475 |
| 7,028,102 | B1 * | 4/2006 | Larsson et al. ............ | 709/246 |
| 2002/0007402 | A1 * | 1/2002 | Thomas Huston et al. .. | 709/217 |
| 2002/0019739 | A1 * | 2/2002 | Juneau et al. ............. | 705/1 |
| 2004/0016002 | A1 * | 1/2004 | Handelman et al. ........ | 725/152 |
| 2004/0072557 | A1 * | 4/2004 | Paila et al. ............... | 455/414.1 |

OTHER PUBLICATIONS

Anderson (Fredrik Andersson and Magnus Karlsson, "Secure Jini Services in Ad Hoc Networks", 2000).*
Pfaffenberg (Bryan Pfaffenberg, "Dictionary of Computer Terms", ISBN: 0-02-862884-5, 1999), pp. 79-80.*
Stallings (William Stallings, "Network Security Essentials: Applications and Standards", ISBN: 0130160938, 2000), pp. 49-52.*

* cited by examiner

*Primary Examiner*—Kambiz Zand
*Assistant Examiner*—Peter Poltorak
(74) *Attorney, Agent, or Firm*—McAndrews Held & Malloy, Ltd.

(57) ABSTRACT

Certain embodiments of the invention may provide a method and system for secure access to a media peripheral in a home via a node in a communication network and may comprise attempting to identify previously acquired security data associated with the media peripheral. If the security data is not found, information associated with the home may be exchanged and security data associated with the media peripheral may be acquired and utilized to facilitate secure communication between the media peripheral and the communication network. The security data may also be authenticated and/or transferred to, for example, a media exchange server or other server coupled to the communication network. If previously acquired security data associated with the media peripheral is found, an identifier associated with the home may be acquired, authenticated, registered and/or distributed throughout the communication network.

15 Claims, 14 Drawing Sheets

| CHANNEL LINE UP | HOUR, DAY | | | | |
|---|---|---|---|---|---|
| | <<1PM | 2PM | ... | 6PM | 7PM>> |
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO 803 | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO 804 | Overnight Delivery: Avail. Nxt Morning Cost: 5c (Server Stored) | | | Showing All Day (48 Min), Earliest Order Time: 4:00PM MPEG-2 19 Mbps | |

Fig. 8

SECURE MEDIA PERIPHERAL ASSOCIATION IN A MEDIA EXCHANGE NETWORK

CROSS-REFERENCE TO RELATED APPLICATIONS/INCORPORATION BY REFERENCE

This application makes reference to, claims priority to, and claims the benefit of:

U.S. Provisional Application Serial No. 60/432,472 filed Dec. 11, 2002;

U.S. Provisional Application Serial No. 60/443,894 filed Jan. 30, 2003;

U.S. Provisional Application Serial No. 60/457,179 filed Mar. 25, 2003; and

U.S. Provisional Application Ser. No. 60/461,717 filed Apr. 10, 2003.

This application also makes reference to:

U.S. patent application Ser. No. 10/657,390, Publication No. 2004/0117845,filed Sep. 8, 2003; and U.S. application Ser. No. 10/660,267, Publication No. 2004/0117846,filed Sep. 11, 2003.

All of the above stated applications are incorporated herein by reference in their entirety.

FIELD OF THE INVENTION

Certain embodiments of the invention relate to information transfer in a distributed media network. More specifically, certain embodiments of the invention relate to secure peripheral association with authentication in a media exchange network.

BACKGROUND OF THE INVENTION

Today, digital media devices such as digital camcorders, digital cameras, and MP3 players are standalone devices that may be connected to a computing device such as personal computer (PC) through, for example, a universal serial bus (USB), Firewire (IEEE 1394) or other suitable interface. These interfaces are general high speed interfaces that may permit download of digital files without any form of user authentication or authorization.

In instances where a digital media device may roam or relocate from a first location having a PC to a second location lacking a PC, utilization of the digital device by a user may be limited basic operations, for example. For example, the user may be limited by the memory capacity of the digital media device and any additional memory that may be utilized the digital media device. The additional memory may include plug-in memory cards such as CompactFlash, SmartMedia™, Memory Stick™, Secure Digital™, MultiMedia, PCMCIA, tape CD-R, CD-RW, DVD-R and/or DVD-RW. The user of the device has to travel with appropriate memory device to ensure that they are available when needed.

Digital files within a digital media device may be downloaded to a PC, encrypted by the PC, attached to an email message, and sent to another PC via the Internet. Also, the digital files may be sent over a network using, for example, file transfer protocol (FTP), and hypertext transfer protocol (HTP) their variants and other similar transfer protocols. However, neither the Internet nor the network has any knowledge of the original source of the digital files such as the digital media device. This raises security concerns including data integrity, media integrity and device integrity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for secure access to a media peripheral in a home via a node in a communication network. Aspects of the method may comprise attempting to identify previously acquired security data associated with the media peripheral. In instances where security data is not found, information associated with the home may be exchanged and security data associated with the media peripheral may be acquired. The acquired security data associated with the media peripheral may be utilized to facilitate secure communication between the media peripheral and the communication network. The security data such as a digital certificate, for example, may also be authenticated. Notwithstanding, security data may be transferred to, for example, a media exchange server or other server coupled to the communication network.

In instances where previously acquired security data associated with the media peripheral is found, one or more identifiers associated with the home may be acquired. The acquired security data may be authenticated prior to communication occurring over the communication network and the media peripheral registered for subsequent operation. In another aspect of the invention, at least one user identifier may be established to facilitate communication of the media peripheral over the communication network. Accordingly, the identifier may be registered. Security data for a registered media peripheral may be distributed throughout at least a portion of the communication network so that it may be subsequently utilized.

Another embodiment of the invention may provide a machine-readable storage, having stored thereon, a computer program having at least one code section for providing secure access to a media peripheral in a home via a node in a communication network. The at least one code section may be executable by a machine, thereby causing the machine to perform the steps as described above for providing secure access to a media peripheral in a home via a node in a communication.

Another embodiment of the invention for secure access to a media peripheral in a home via a node in a communication network may comprise detecting when the media peripheral is communicatively coupled to the node, acquiring security data associated with the media peripheral, and utilizing the acquired security data to facilitate secure communication between the media peripheral and the communication network. Security data, for example, a digital certificate, may be read from the media peripheral and may also be transferred to a media exchange server that is coupled to the communication network. The security data may be authenticated and the media peripheral may be registered for subsequent operation. The security data may also be distributed throughout at least a portion of the communication network.

Another aspect of the invention may also comprise a system for establishing secure access to a media peripheral in a home via a node in a communication network. Aspects of the system may include at least one processor that may be adapted to identify previously acquired security data associated with the media peripheral. The processor may be a computer processor, a media peripheral processor, a media exchange system processor, a media processing system processor or a combination thereof.

Notwithstanding, if the security data is not found, the processor may exchange information associated with the home and acquire security data associated with the media peripheral. The processor may be configured to utilize the acquired security data associated with the media peripheral to facilitate secure communication between the media peripheral and the communication network. The security data may be a digital certificate, for example. The processor may read or otherwise acquire the security data from the media peripheral and transfer at least portions of the security data to a server such as a media exchange server or security server. The processor may also authenticate the security data The processor may also be adapted to acquire at least one identifier associated with the home if previously acquired security data associated with the media peripheral is found. Accordingly, the processor may also validate the acquired security data prior to communication occurring over the communication network. Security data for the media peripheral may be registered by the processor and distributed throughout the network. The processor may also establish and/or register at least one user identifier that may be utilized to facilitate communication of the media peripheral over the communication network.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a media guide user interface showing several options of a pushed media in accordance with an embodiment of the present invention.

DETAILED DESCRIPTION OF THE INVENTION

Certain embodiments of the invention provide a method and system for secure access to a media peripheral in a home via a node in a communication network. The method may comprise the step of attempting to identify previously acquired security data associated with the media peripheral. If the security data is not found, information associated with the home may be exchanged and security data associated with the media peripheral may be acquired and utilized to facilitate secure communication between the media peripheral and the communication network. The security data may also be authenticated and/or transferred to, for example, a media exchange server or other server coupled to the communication network.

If previously acquired security data associated with the media peripheral is found, an identifier associated with the home may be acquired. The acquired security data may be authenticated prior to communication occurring over the communication network and the media peripheral registered for subsequent operation. In another aspect of the invention, at least one user identifier may be established to facilitate communication of the media peripheral over the communication network. Accordingly, the identifier may be registered. Security data for a registered media peripheral may be distributed throughout at least a portion of the communication network so that it may be subsequently utilized.

Figure 1:
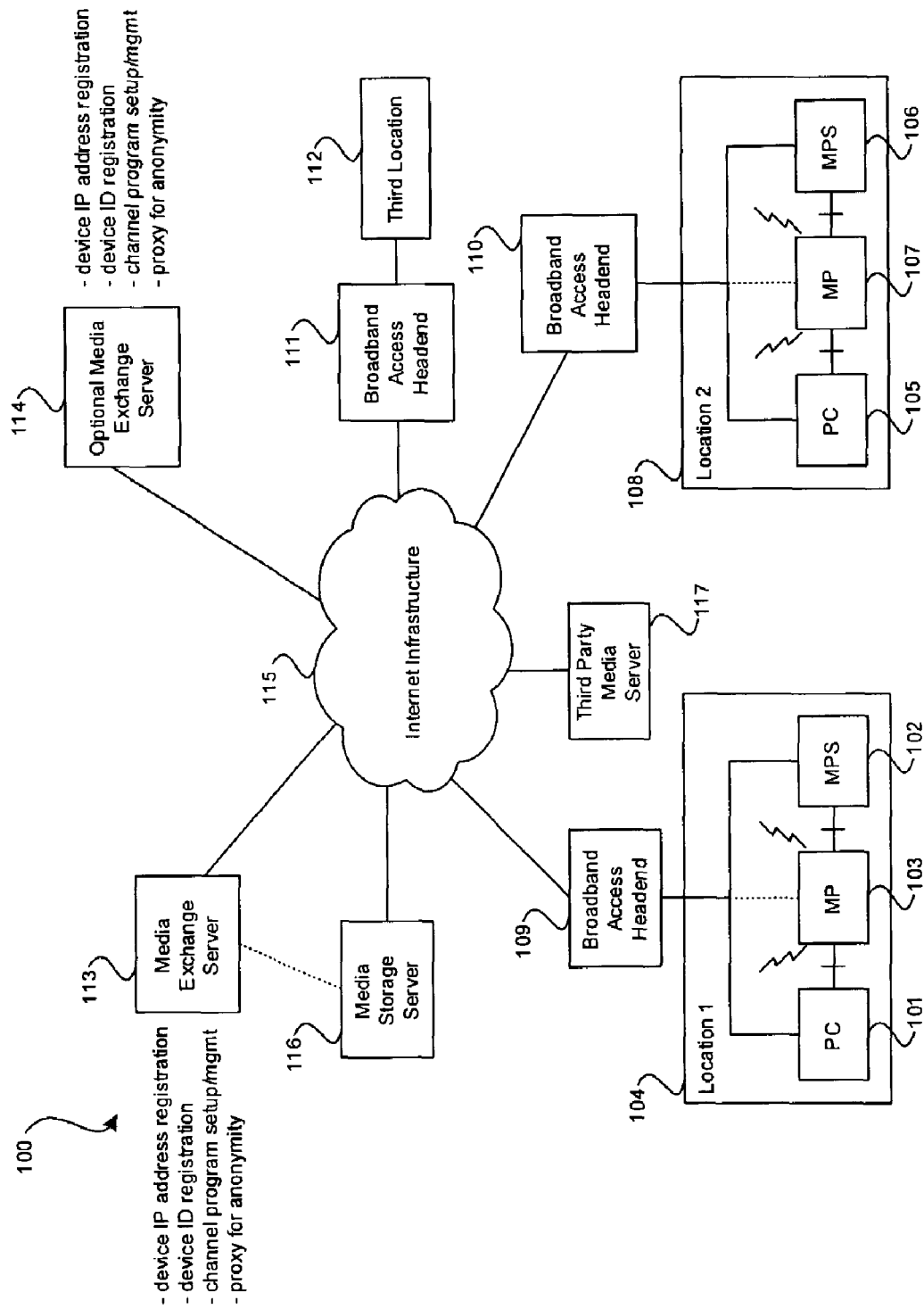
FIG. 1 is a diagram illustrating an embodiment of a media exchange network comprising an architecture to support secure media peripheral association and authentication, in accordance with various aspects of the invention.

FIG. 1 is a diagram illustrating an embodiment of a media exchange network 100 comprising an architecture to support secure media peripheral association and authentication, in accordance with various aspects of the invention. Specifically, the media exchange network 100 may be a communication network comprising a personal computer (PC) 101, a media processing system (MPS) 102, and at least one media peripheral (MP) 103 at a first location 104. The first location may be a first home, for example. Additionally, a PC 105, an MPS 106, and at least one MP 107 may be located at a second location 108. The second location 108 may be a home. The MP 103 may interface with the PC 101 and/or the MPS 102 via, for example, a wireless link and/or a wired link. The wired link may be a USB or a Firewire (IEEE 1394) connection. A personal computer (PC) comprising media exchange software (MES) running on or being executed by the personal computer, may also be referred to as a media processing system. Accordingly, as utilized herein, the term personal computer or PC refers to a personal computer that is not running or executing the media exchange software, unless otherwise stated.

The PC 101 and the MPS 102 may interface with a broadband access headend 109. The broadband access headend 109 may comprise a cable headend, a satellite headend, and/or a DSL headend, in accordance with various embodiments of the invention. Optionally, the MP 103 may interface with the broadband access headend 109. The PC 101, MPS 102, and/or MP 103 may include internal modems such as a cable modem or DSL modem, or other interface devices in order to communicate with the broadband access headend 109. Optionally, the interface device such as a modem may be external to the PC 101, MPS 102, and MP 103.

Similarly, the MP 107 may interface with the PC 105 and/or the MPS 106 via, for example, a wireless link and/or a wired link such as a USB or Firewire (IEEE 1394) connection. The PC 105 and the MPS 106 may interface with a broadband access headend 110. The broadband access headend 110 may include a cable headend, a satellite headend, or a DSL headend, in accordance with various embodiments of the present invention. Optionally, the MP 107 may interface with the broadband access headend 110. The PC 105, MPS 106, and/or MP 107 may include internal modems such as a cable modem or DSL modem, or other interface device in order to communicate with the broadband access headend 110. Optionally, the interface device such as a modem may be external to the PC 105, MPS 106, and MP 107.

A media processing system may also comprise a set-top-box (STB), a PC, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the media processing system or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

The media exchange network 100 may further include a broadband access headend 111 that may be connected between a third location 112, an Internet infrastructure 115 and a media exchange server 113. In one aspect of the invention, a single central server may support the media exchange network 100. However, the invention is not so limited, and at least one other media exchange server 114 may optionally support the media exchange network 100 that is coupled to Internet infrastructure 115. This optional arrangement may be referred to as a multiserver arrangement. Accordingly, an embodiment of the present invention may include two or more media exchange servers strategically located at various locations in the media exchange network 100.

The broadband access headends 109 and 110 may also interface to the Internet infrastructure 115. The broadband access headend 111 may include a cable headend, a satellite headend, or a DSL headend, in accordance with various embodiments of the invention. The third location 112 may also include a PC, a media peripheral system, and/or a media peripheral as part of the media exchange network 100. The third location may be a home, for example.

The media exchange network may also include a media storage server 116 and a third ($3^{rd}$) party media server 117, both interfacing to the Internet infrastructure 115. The media storage server 116 may interact with the media exchange server 113 and may provide temporary and/or archival storage for digital media on the media exchange network 100. For example, the media storage server 116 may temporarily store media files that are addressed to certain media peripheral systems and/or PC's on the media exchange network 100. The third ($3^{rd}$) party media server 117 may store movies, video, user profiles, and other digital media that may be provided to users of the media exchange network 100.

In accordance with an alternative embodiment of the invention, a broadband access headend may be upgraded to a media exchange headend by adding functionality to facilitate the exchange of media on the media exchange network in conjunction with the media exchange server. Such functionality may include distributed networking capability and archival or long term media storage functionality, storage management and digital rights management. Temporary storage may be utilized to aid in the distribution and routing of media storage management, and digital rights management.

The media exchange server architecture may solve the problem of communication between a device such as a first media peripheral system, a first PC and a first media peripheral at a first home and second device such as a second media peripheral system, a second PC and a second media peripheral at another home over the media exchange network 100. The media exchange servers 113 and 114 may provide functionality on the media exchange network 100 including device registration, channel/program setup and management, and/or security.

The various elements of the media exchange network 100 may include storage locations for digital media and data. The storage locations may include, for example, hard disk drives, a DVD player, a CD player, floppy disk drives, RAM, or any combination of these. The storage locations may also include, for example, CompactFlash™, SmartMedia™, Memory Stick™, Secure Digital™, MultiMedia, PCMCIA, or any combination thereof.

The PC's 101, 105 may include desktop PC's, PC tablets, notebook PC's, handhelds, PDA's, or any computing device. The MPS's 102, 106 may be regarded as essentially enhanced set-top-boxes. The MPS's 102, 106 may each include a TV screen or monitor for viewing and interacting with various user interfaces, media, data, and services that may be available on the media exchange network. A remote control or pointing device may be utilized for control and/or navigation during viewing and/or interaction. The PC's 101 and 105 may each include a monitor for viewing and/or interacting with various user interfaces, media, data, and services that maybe available on the media exchange network using, for example, a keyboard and/or mouse. The MPS's, PC's, and/or MP's may include functional software that may support interaction with the media exchange servers and media peripherals on the media exchange network 100, in accordance with various embodiments of the invention.

The media peripherals 103, 107 of the media exchange network 100 may include, for example, a digital camera, a digital camcorder, an MP3 player, a home jukebox system, a personal digital assistant (PDA), a multi-media gateway device, and various home appliances. The media peripherals 103, 107 of the media exchange network 100 may include legacy media peripherals which are those media peripherals that are in existence today and are not fully compatible with the media exchange technology in accordance with various aspects of the invention. The media peripherals 103, 107 may also include new non-legacy media peripherals which may not be on the market yet or which are on the market but in either case will be fully compatible with the technology. A legacy media peripheral may not have the software or interface to interact directly with a media processing system on a media exchange network.

A legacy media peripheral may utilize a PC or a set-top-box as a proxy to interact with a media exchange network. A new media peripheral may connect to a media exchange network, interact directly with a media processing system on the media exchange network, and may be capable of utilizing digital certificates, for example. An existing media peripheral may have been designed so that it may be upgradeable. In this regard an existing media peripheral which may not be fully compliant with the technology may be upgraded to be wholly compliant with the technology associated with the various aspects of the invention.

In an embodiment of the present invention, a digital certificate may be embedded in the firmware or hardware of a new non-legacy media peripheral. The digital certificate may include certain information such as a device ID, a public key for encryption, and possibly other information related to services, payment terms, billing, and media push/pull and access restrictions and limitations. The digital certificate may be installed in the media peripheral by the manufacturer, network administrator or retailer at the time of purchase. Alternatively, the digital certificate may be downloaded by the manufacturer to the media peripheral, over a media exchange network, via a PC or a media peripheral system when a user first connects the media peripheral to a PC or a media peripheral system.

As used herein, a legacy media peripheral does not include a digital certificate or any other type of identifying firmware, software, or electronic hardware for interacting with a media exchange network. A legacy media peripheral relies on a PC or an MPS on the media exchange network to act as a proxy for the media peripheral for the purposes of association, authentication, and routing on the media exchange network. As used herein, a non-legacy media peripheral is a media exchange network ready peripheral device and includes a digital certificate or any other type of identifying firmware, software, or electronic hardware that may be read by or transferred to a PC, an MPS, or a broadband access headend on a media exchange network. A non-legacy MP may be moved to different locations and still be recognized by the media exchange network when connected to the media exchange network at those different locations through a PC, a media peripheral system, or a broadband access headend. Other embodiments of the invention may include various combinations and/or multiple instantiations of the elements of FIG. 1, in accordance with various aspects of the invention.

Figure 2A:
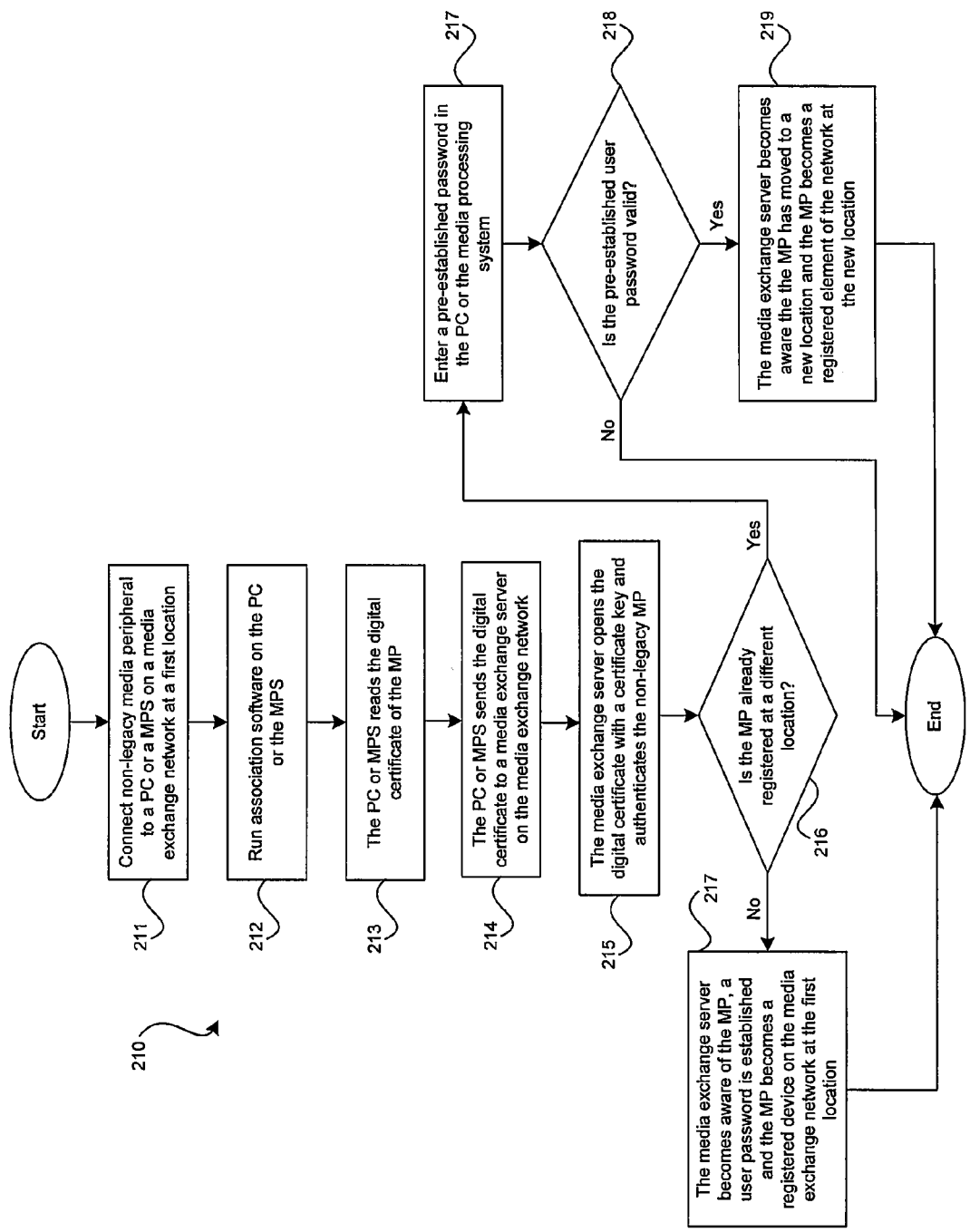
FIG. 2A is a flowchart illustrating an embodiment of an exemplary method that may be utilized to establish secure association and authentication of a new or non-legacy media peripheral on the media exchange network of FIG. 1, in accordance with various aspects of the present invention.

FIG. 2A is a flowchart illustrating an embodiment of an exemplary method 210 that may be utilized to establish secure association and authentication of a new or non-legacy media peripheral on the media exchange network of FIG. 1, in accordance with various aspects of the present invention. Referring to FIG. 2A, in step 211, a new or non-legacy media peripheral may be connected to a PC and/or a media processing system on a media exchange network at a first location. In step 212, association software may be run on the PC or the media processing system. The association software may be part of a media exchange software (MES) platform installed on the PC or the media processing system, in accordance with an embodiment of the invention.

In step 213, the PC or media processing system may read the digital certificate of the non-legacy media peripheral. In step 214, the PC or the media processing system may send or otherwise transfer the digital certificate information to a media exchange server on the media exchange network. In step 215, the media exchange server may open the digital certificate with an associated certificate key and authenticate the media peripheral. In step 216, if the non-legacy media peripheral is not already registered at a different location than the first location then, in step 217, the media exchange server may become aware of the media peripheral. Additionally, in step 217, a user password may be established, and the non-legacy media peripheral may become a legitimately registered device on the media exchange network at the first location.

In step 216, if the non-legacy media peripheral is already registered at a different location, then in step 218, a pre-established password may be entered into the PC or the media processing system. In step 219, if the user password is determined to be valid then, in step 220, the media exchange server may become aware that the non-legacy media peripheral has moved to a new location and the non-legacy media peripheral becomes an authenticated, registered element of the media exchange network at the new location. Otherwise, the non-legacy media peripheral may be effectively locked out of or prevented from gaining access to the media exchange network.

In accordance with another embodiment of the invention, a new or non-legacy media peripheral may include special software that may allow a digital certificate in the media peripheral to be read by or transferred to a PC, a media processing system, or a broadband access headend on a media exchange network. The digital certificate may be opened with a certificate key by a certificate authority in the media exchange network in order to authorize the non-legacy media peripheral. The certificate authority may be part of a media exchange server on the media exchange network.

Figure 2B:
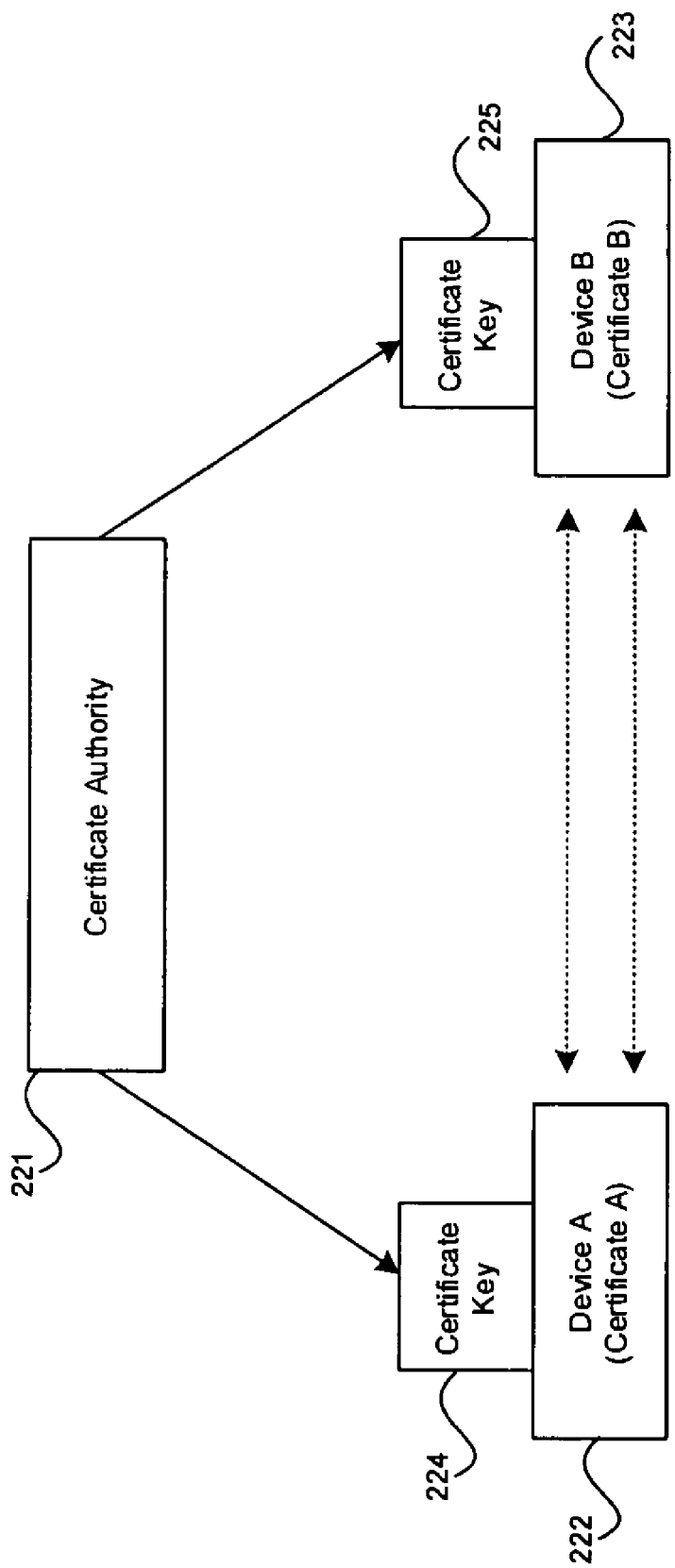
FIG. 2B is a functional diagram illustrating an embodiment for establishing a secure association and authentication of a non-legacy media peripheral on the media exchange network 100 of FIG. 1 using digital certificates, in accordance with various aspects of the present invention.

FIG. 2B is a functional diagram illustrating an embodiment for establishing a secure association and authentication of a non-legacy media peripheral on the media exchange network 100 of FIG. 1 using digital certificates, in accordance with various aspects of the present invention. The functional diagram of FIG. 2B may include a certificate authority 221, a device A 222, and a device B 223. The functional diagram of FIG. 2B may also include a certificate key 224 and a certificate key 225. Device A may have an associated certificate A and device B may have an associated certificate B.

In one aspect of the invention, the certificate authority 221 may reside within the media exchange server 113 of FIG. 1. Device A 222 may include the media peripheral 103 at the first location 104. Device B 223 may include the media peripheral 107 at the second location 108. In general however, the device A 222 and the device B 223 may comprise a media peripheral, a media processing system, or a PC.

As an illustration, a media processing system may communicate with a certificate authority server when the media processing system is initially connected to a media exchange network. The certificate authority may update and maintain certificate keys and a certificate revocation list, for example. When a certificate authority sends a certificate key to a media processing system, the media processing system may open a digital certificate with the corresponding certificate key and authenticate a device associated with the digital certificate. The media processing system may essentially operate or function as a gatekeeper between the device and the media exchange network.

Typically, a certificate key may be provided by an issuing certificate authority such as certificate authority 221. Notwithstanding, in accordance with an alternative embodiment of the invention, a certificate key may be embedded in, for example, a media processing system at the time of manufacture of the MPS. In another aspect of the invention, the MPS may include a memory such as an EEPROM, which may be updated at any time with a certificate key.

With reference to FIG. 2B, the certificate key 224 and the certificate key 225 may be identical and may be provided to the device A 222 and the device B 223 by the certificate authority 221. The certificate keys 224, 225 are certificate keys that may correspond to a predefined family of devices such as all valid devices of a certain type such as digital cameras. A certificate key may be utilized to effectively "open up" a digital certificate to authenticate a digital certificate.

A manufacturer, for example, may assign a legitimate device identification (ID) and a corresponding public key to a particular media peripheral, for example. A public key may be utilized for encryption of digital information. A first device may process a certificate key along with a digital certificate received from a second device to authenticate the second device. In a media exchange network, many different types of peripherals may connect to a media processing system. For example, a certain manufacturer may provide a family of digital camcorders, a family of digital cameras, and a family of MP3 players. In this regard, each of the families of peripherals may be assigned their own common certificate key.

As an example, device A 222 may contain or have an associated digital certificate A and device B 223 may contain or have an associated digital certificate B. Certificate A may include a device identification (ID) A and a public key A, and certificate B may include a device ID B and a public key B.

In operation, if device B 223 wants to communicate with device A 222 over a media exchange network 100, for example, device B 223 may send certificate B to device A 222 via the media exchange network 100. Device A 222 may authenticate certificate B by processing certificate B with the certificate key 224 before allowing communication with device B 223. If device A 222 does not authenticate device B 223, then device A 222 may reject any further communication with device B 223.

If, for example, a user of device B 223 loses device B 223 or device B 223 is stolen, the certificate authority 221 may add device B 223 to a certificate revocation list (CRL). The certificate authority 221 may keep or manage the certificate revocation list that now includes device B 223 and may prohibit device B 223 from being authenticated and authorized for media exchange on the media exchange network 100. In one aspect of the invention, varying levels of communication may be permitted by media peripherals that may be listed in the certificate revocation. For example, a stolen device may be absolutely prohibited from accessing the media exchange network. However, a device may be permitted access to emergency services such as 911 based services.

If the device B 223 is validated as a legitimate device on the media exchange network by the device A 222, the device A 222 may send media to the device B 223 via the media exchange network 100. For example, the device A 222 may encrypt a media file using the public key B received from device B and send the encrypted file to the device B 223 over the media exchange network 100. The device B 223 may then utilize its private key B to decrypt the received file. A private key may be held by a device and not shared with anyone else on the media exchange network 100. The private key B may be utilized to decrypt a file encrypted by the public key B, which may be shared. Similarly, device B 223 may encrypt a file with the public key A received from device A 222. Device A 222 may then utilize its private key A to decrypt the file received from the device B 223. This type of encryption/decryption technique may be referred to as asymmetric cryptography. On the other hand, symmetric cryptography utilizes a single key for encryption and decryption. However, symmetric key exchange between two devices may be performed using asymmetric cryptography for the secure exchange of the symmetric keys.

Figure 2C:
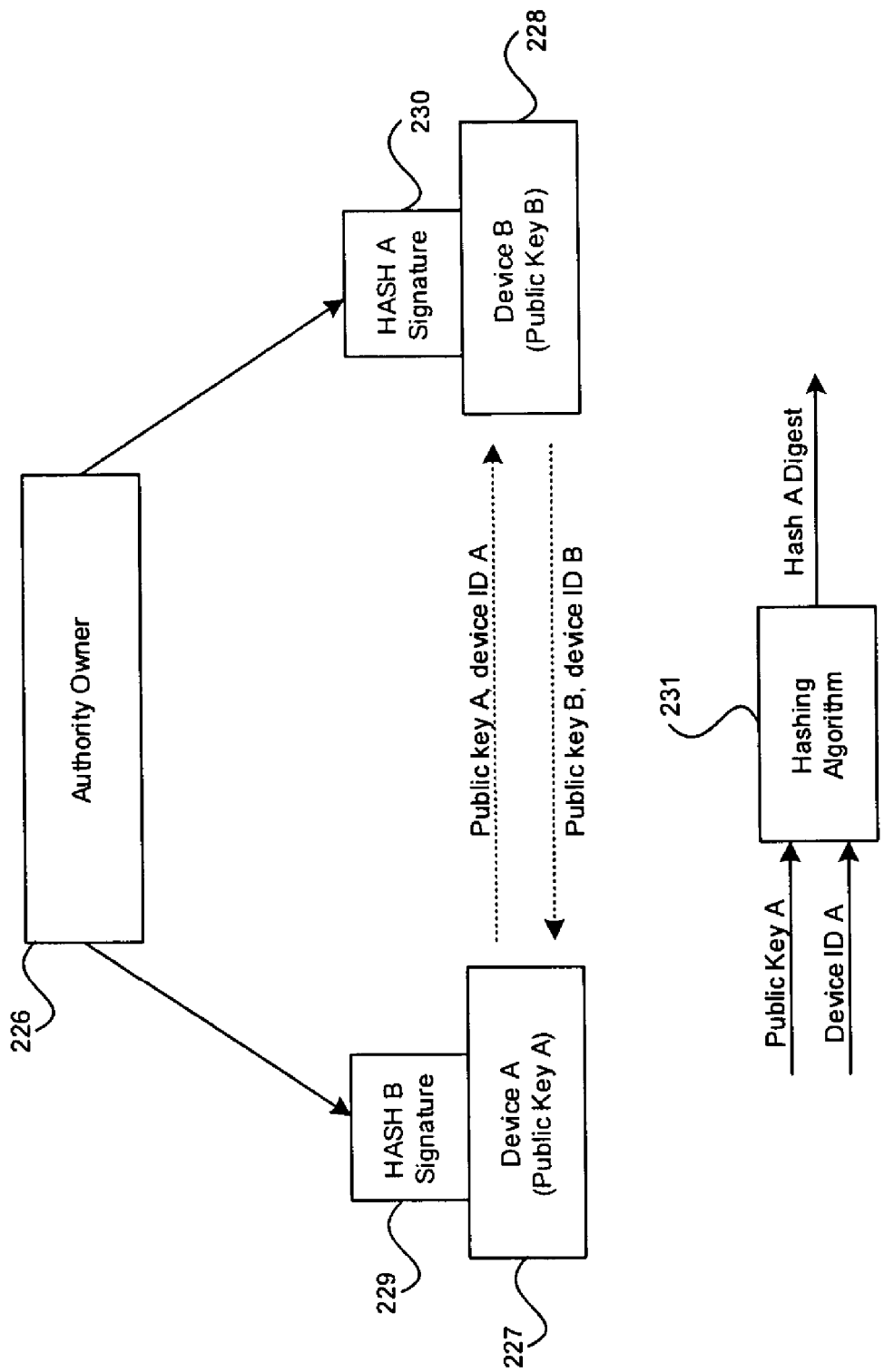
FIG. 2C is a functional diagram illustrating an embodiment for establishing a secure association and authentication of a non-legacy media peripheral on the media exchange network 100 of FIG. 1 using a hashing technique, in accordance with various aspects of the present invention.

FIG. 2C is a functional diagram illustrating an embodiment for establishing a secure association and authentication of a non-legacy media peripheral on the media exchange network 100 of FIG. 1 using a hashing technique, in accordance with various aspects of the present invention. FIG. 2C illustrates an alternative method to using digital certificates for authentication and security. The functional diagram of FIG. 2C may include an authority owner 226, a device A 227, and a device B 228. The functional diagram of FIG. 2C may also include HASH A signature 230 and a HASH B signature 229. The device A 227 and the device B 228 may each include a hashing algorithm 231.

In accordance with an aspect of the invention, the authority owner 226 may reside within the media exchange server 113 of FIG. 1, for example. Device A 227 may include the media peripheral 103 located at the first location 104. Device B 228 may include the media peripheral 107 located at the second location 108. In general, device A 227 and device B 228 may include a media peripheral, a media processing system, or a PC.

As an example, it may be desirable for device A 227 to encrypt a file and transfer the encrypted file to device B 228 via the media exchange network 100. The associated public key A and device ID for device A 227 may be transferred to device B 228 via the media exchange network. It may be desirable for device B 228 to confirm that the source of public key A was really the device A 227. Accordingly, the authority owner 226 may provide a HASH B signature 229 to device A 227 and a HASH A signature 230 to device B 228.

Device B 228 may utilize the hashing algorithm 231 to process the device ID A and the public key A in order to generate a hash A digest. Device B 228 may subsequently compare the hash A digest to the HASH A signature 230. If the hash A digest matches the HASH A signature 230, then device B 228 may authorize device A 227 to transfer the file to device B 228. Otherwise, device A 227 may be prevented from transferring the file to device B 228. Similarly, device B 228 may want to transfer a file to device A 227 via the media exchange network 100. In this regard, the hashing technique may be applied in a manner similar to the previous example in accordance with the invention.

Other aspects of the invention for secure access to a media peripheral in a home via a node in a communication network may comprise the steps of detecting when the media peripheral is communicatively coupled to the node, acquiring security data associated with the media peripheral, and utilizing the acquired security data to facilitate secure communication between the media peripheral and the communication network. The security data, which may be, for example, a digital certificate, may be read from the media peripheral and may also be transferred to a media exchange server that is coupled to the communication network. The security data may be authenticated and the media peripheral may be registered for subsequent operation. The registered security data may also be distributed throughout at least a portion of the communication network.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
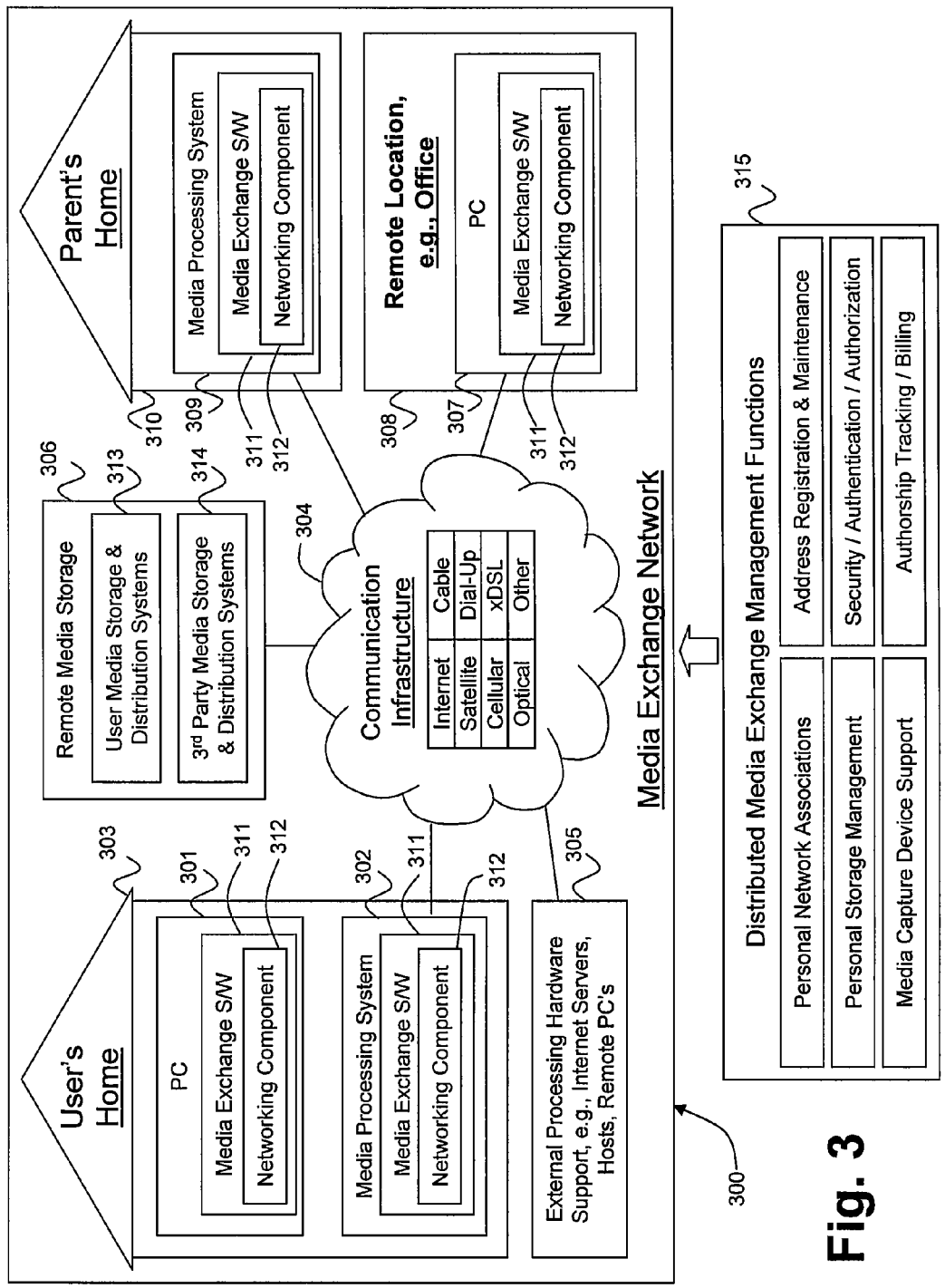
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

U.S. patent application Ser. No. 10/675,382 filed Sep. 30, 2003, provides an exemplary media view and a device view, which may be part of an media guide interface in accordance with various embodiments of the invention, and is hereby incorporated herein by reference in its entirety. U.S. patent application Ser. No. 10/675,467 filed Sep. 30, 2003, provides an exemplary channel view or channel guide, which may also be part of an media guide interface in accordance with various embodiments of the invention, and is hereby incorporated herein by reference in its entirety.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
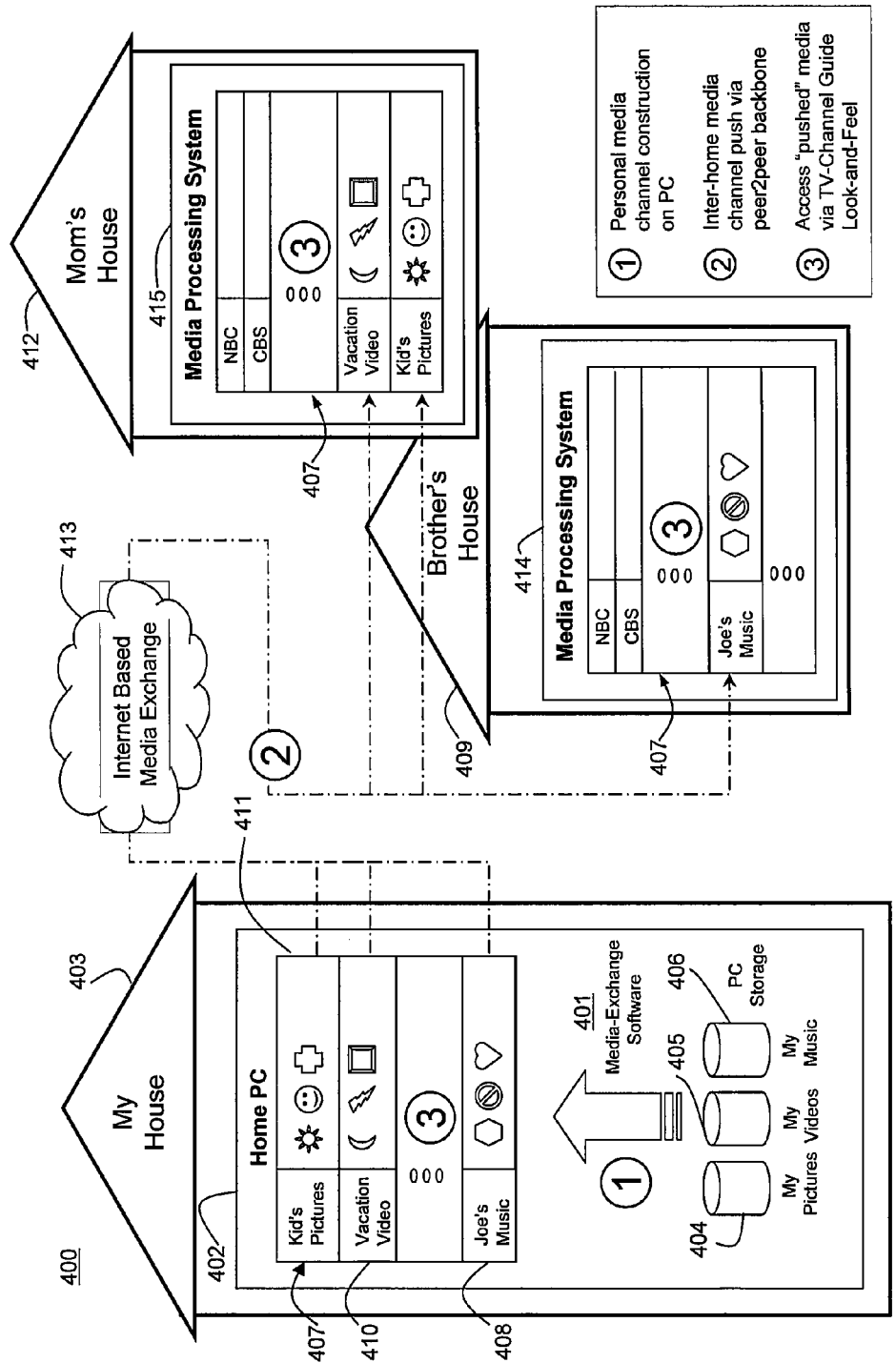
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
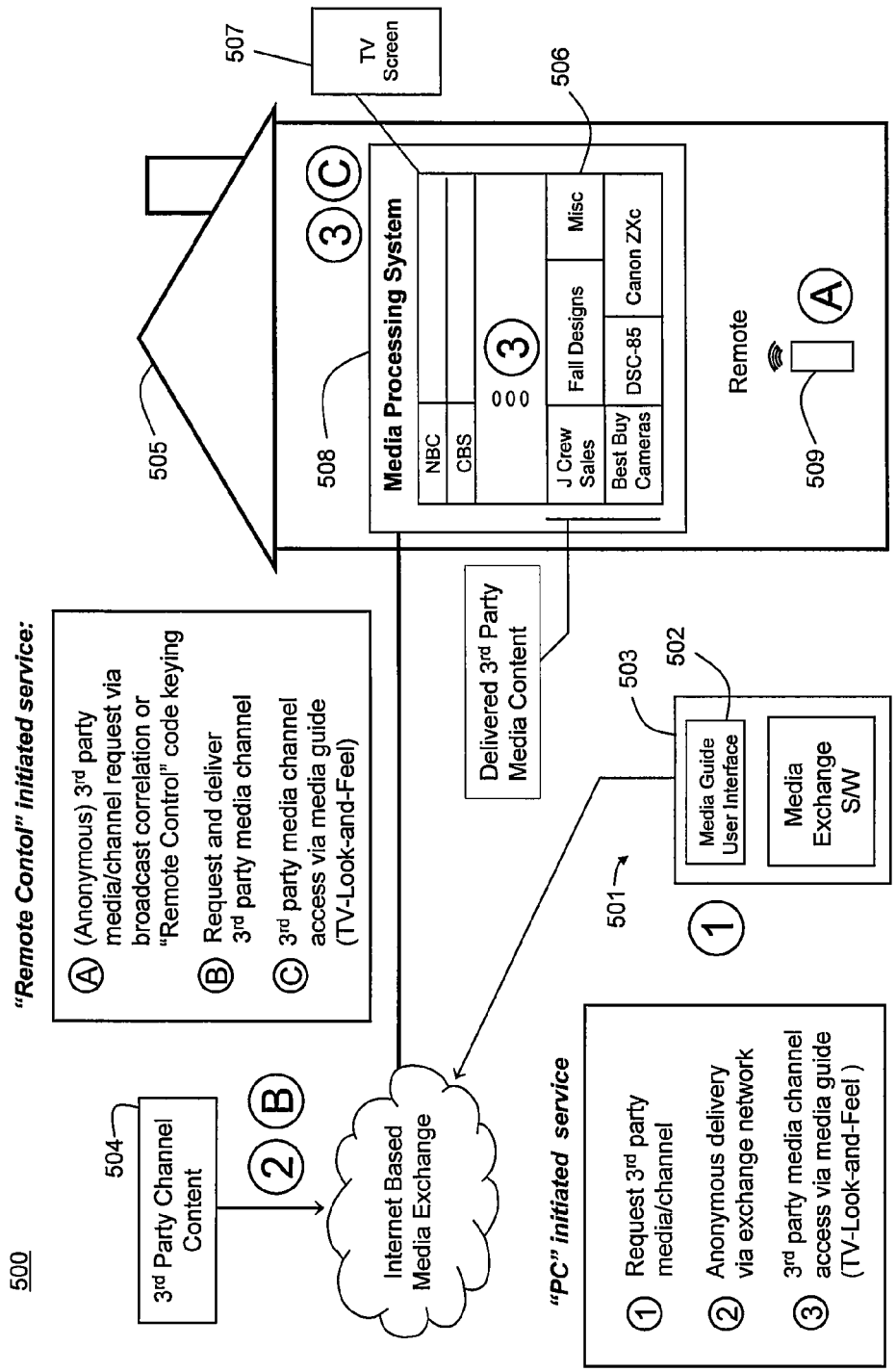
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
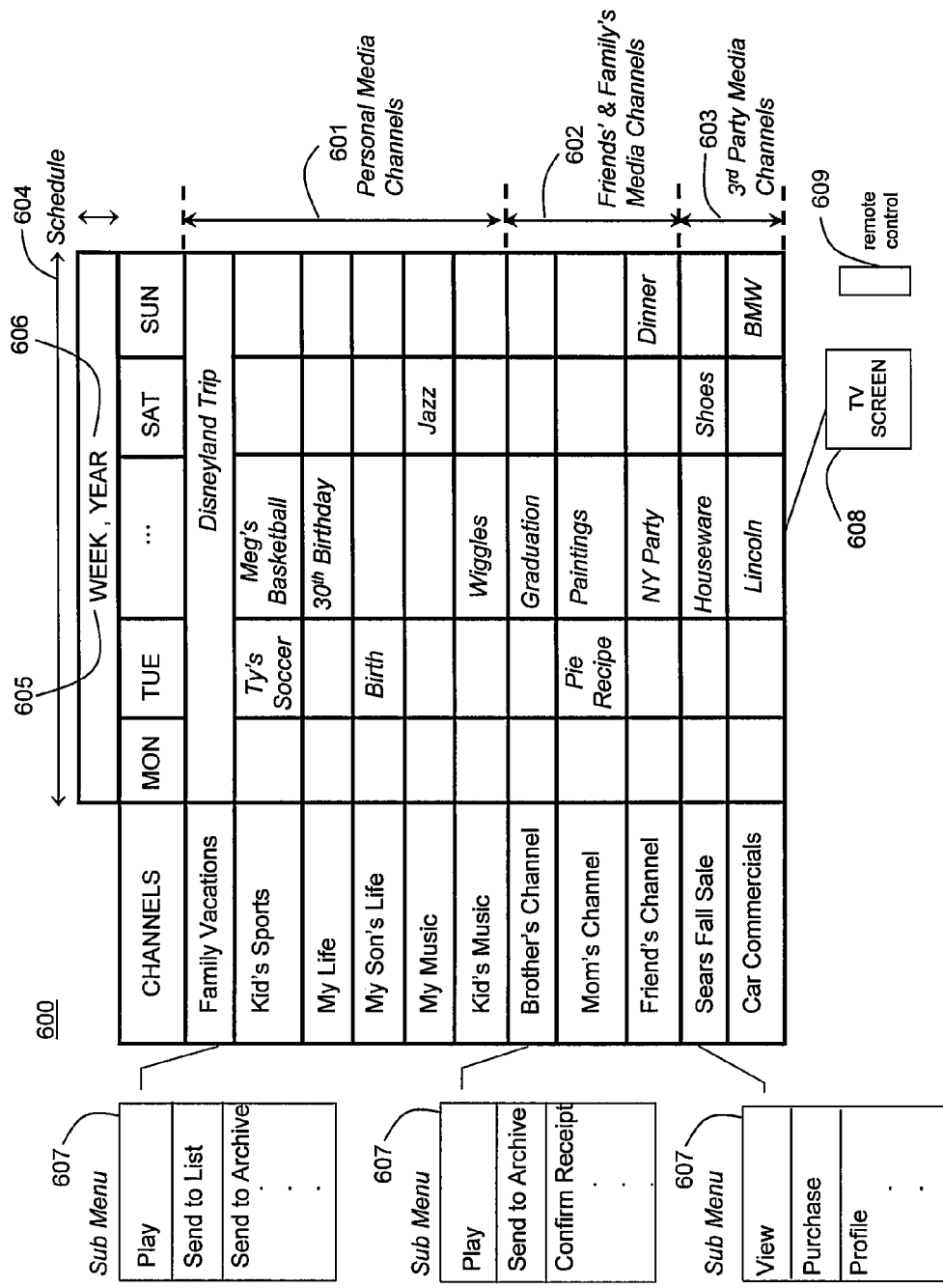
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
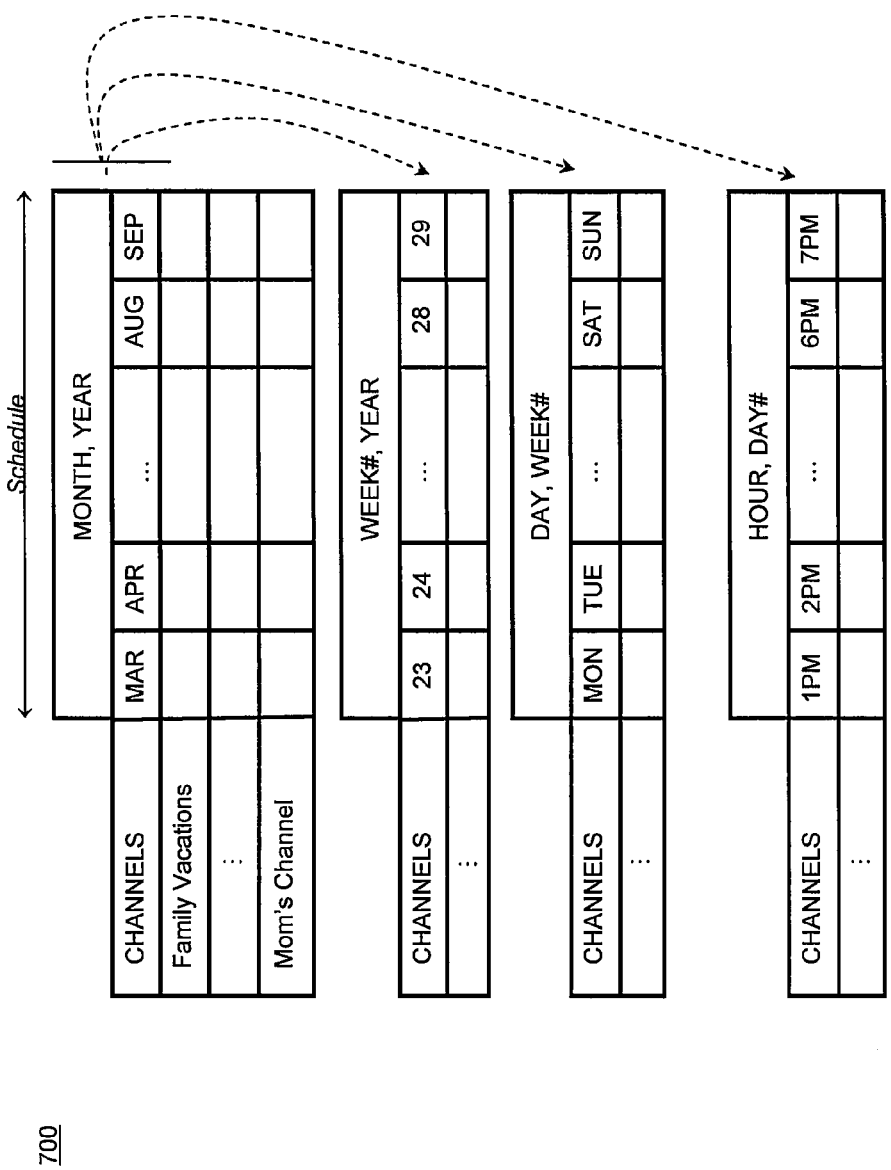
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
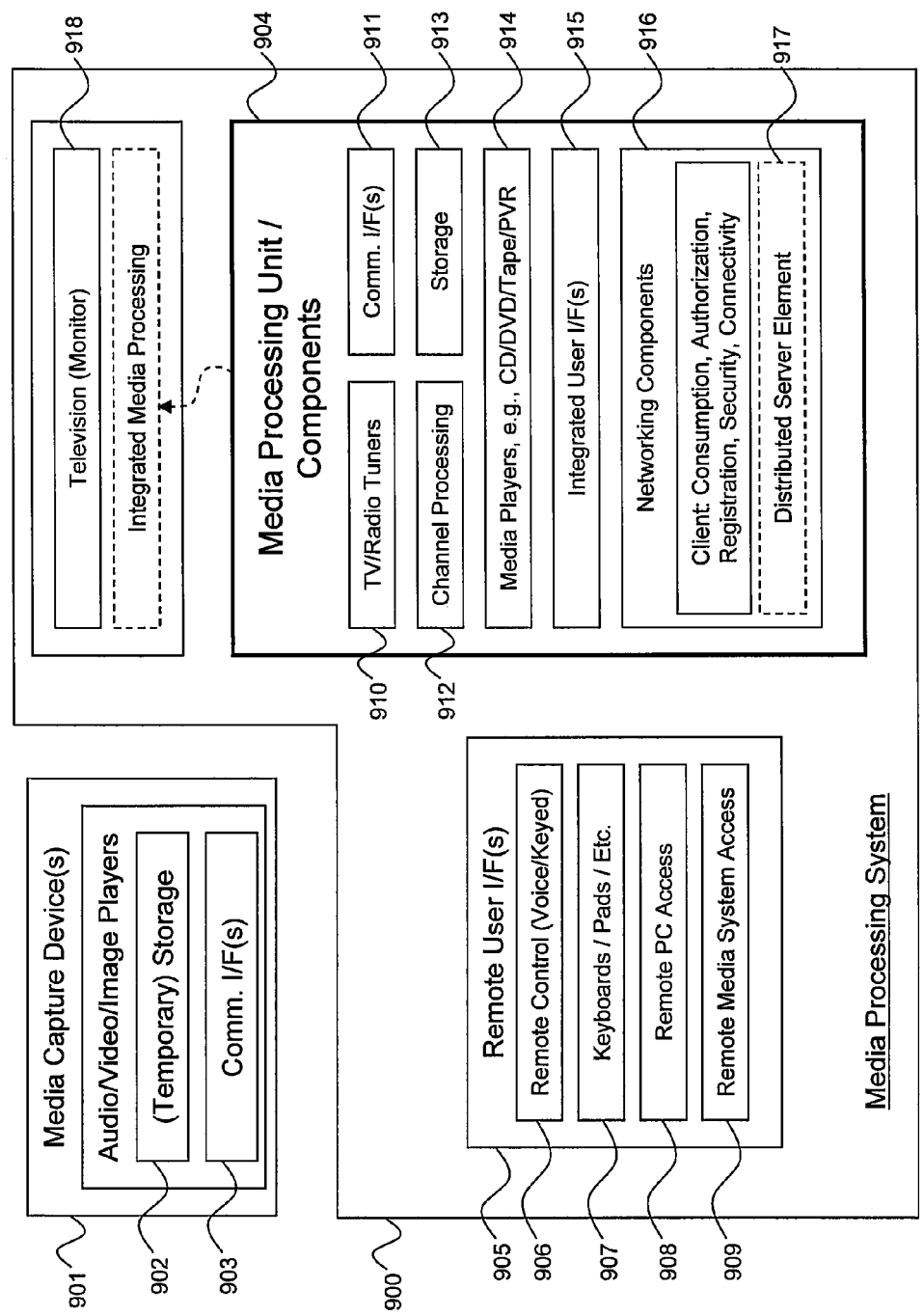
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
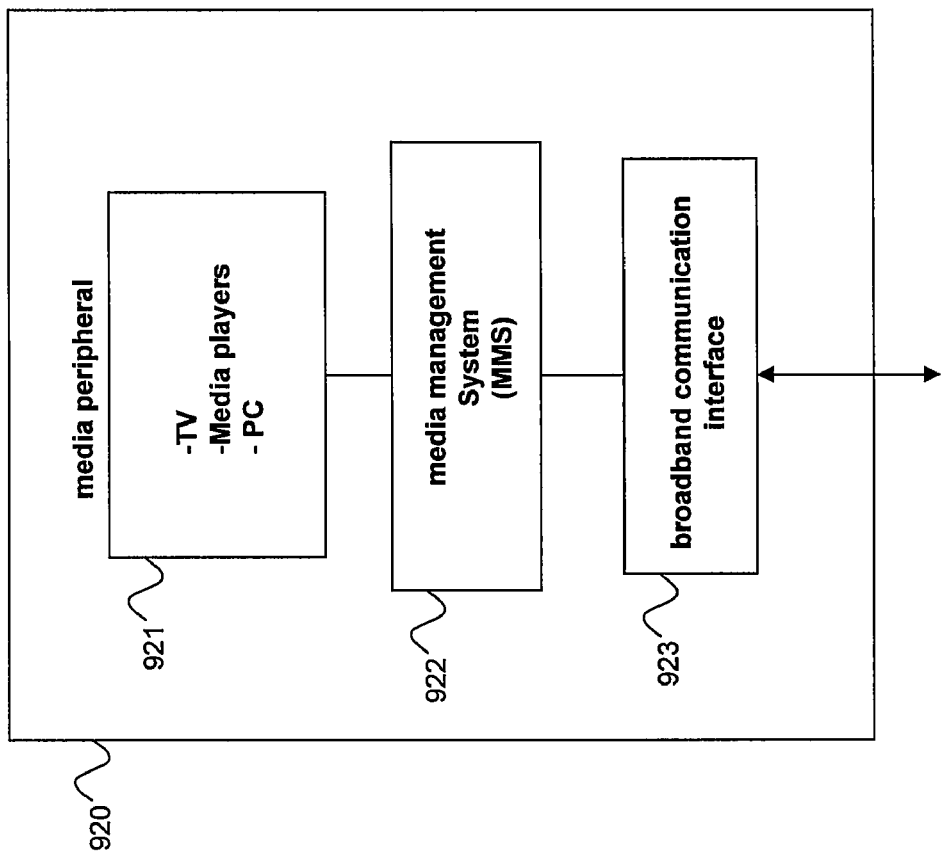
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
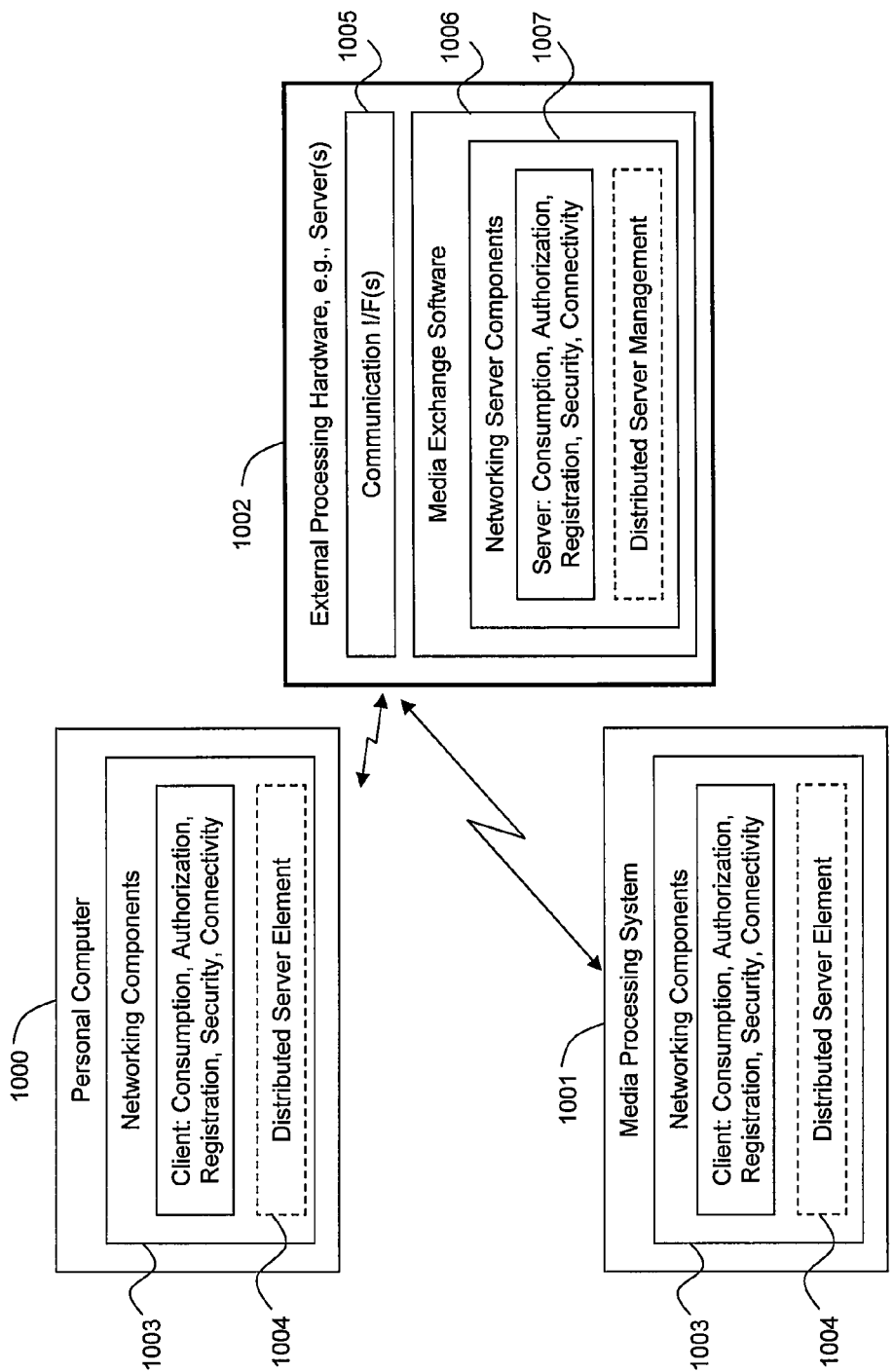
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
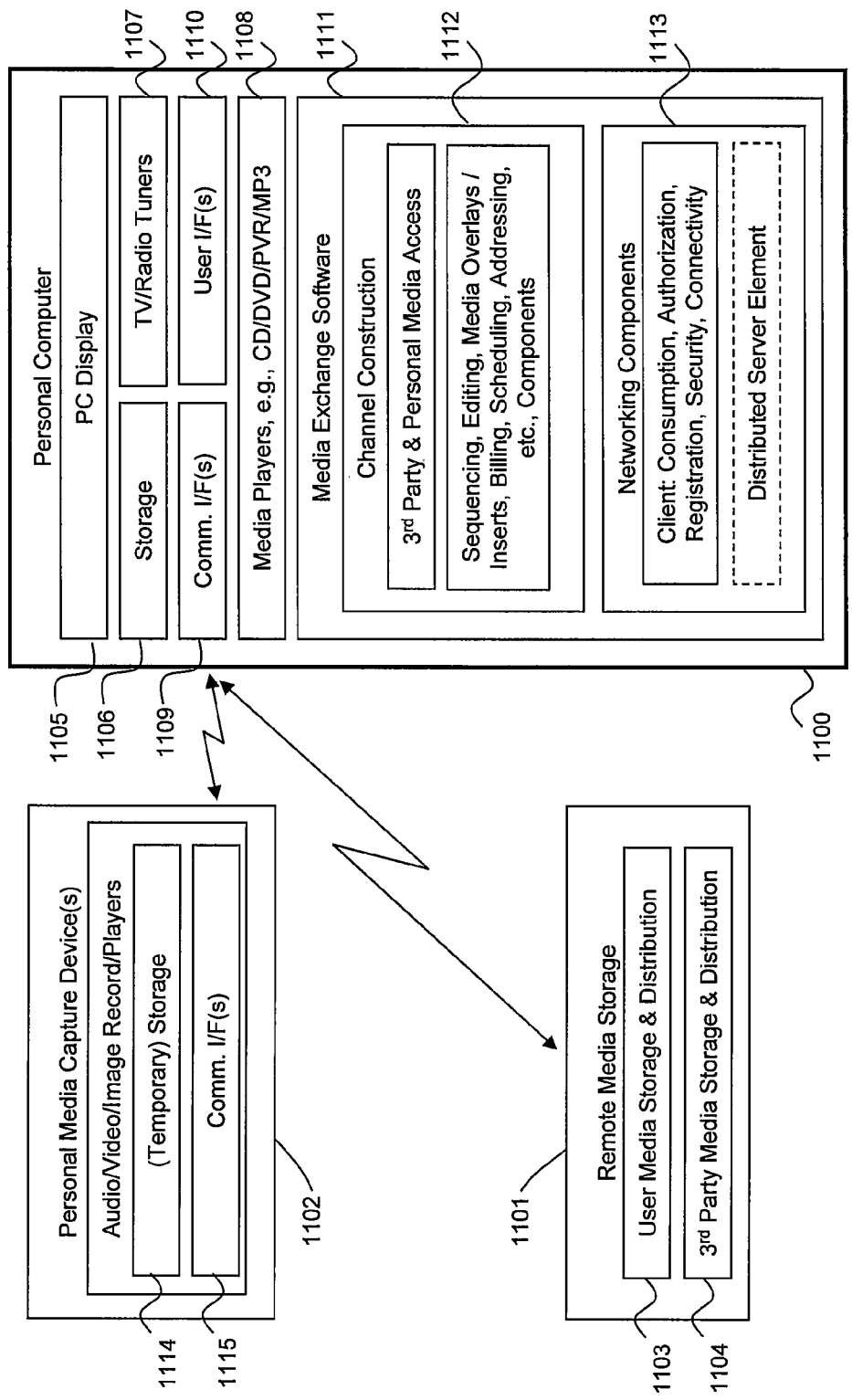
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Another embodiment of the invention may provide a method and system for secure access and communication of information through secure media peripheral association with authentication. The method for secure access and communication of information may include the step of detecting when a non-legacy media peripheral is connected to a PC and/or a media processing system on the distributed media network. A digital certificate associated with the non-legacy media peripheral may be acquired and utilized to facilitate communication of the non-legacy media peripheral over the distributed media network. The digital certificate may be read from the non-legacy media peripheral and transferred to a media exchange server coupled to the distributed media network. The digital certificate may also be authenticated. Media peripheral association software may be executed on the PC and/or the media processing system to provide peripheral association with authentication in accordance with embodiments of the invention.

The method may also include determining whether the non-legacy media peripheral was previously registered at a first location within the distributed media network. If the non-legacy media peripheral was previously registered at a first location, a user identifier utilized during the prior registration may be acquired and utilized to facilitate current communication of the non-legacy media peripheral over the distributed media network. The acquired identifier may be authenticated prior to permitting the non-legacy media peripheral to access or communicate over the distributed media network. The non-legacy media peripheral may be registered for operation at a second location subsequent to validating the acquired user identifier. An aspect of the invention may include establishing and registering at least one user identifier that may be utilized to facilitate communication of the non-legacy media peripheral over the distributed media network.

Another embodiment of the invention may provide a machine-readable storage, having stored thereon, a computer program having at least one code section for providing secure access and communication of information through media peripheral association with authentication, according to the steps as described above.

Aspects of the system for secure access and communication of information through secure media peripheral association with authentication. At least one processor may be utilized to detect when a non-legacy media peripheral is connected to a PC and/or a media processing system on the distributed media network. The processor may be a computer processor, a media peripheral processor, a media exchange system processor, a media processing system processor or any combination thereof. Notwithstanding, the processor may acquire a digital certificate associated with the non-legacy media peripheral and utilize the digital certificate to facilitate communication of the non-legacy media peripheral over the distributed media network. The digital certificate may be read from the non-legacy media peripheral and transferred to a media exchange server coupled to the distributed media network by the processor. One of the processors such as the media exchange server processor may authenticate the digital certificate to ensure its integrity. The processor may execute media peripheral association software on the PC and/or the media processing system in order to provide media peripheral association with authentication in accordance with embodiments of the invention.

In another aspect of the invention, the processor may determine whether the non-legacy media peripheral was previously registered within the distributed media network. For example, the non-legacy media peripheral may have previously registered at a first location within the distributed media network. If it is determined that the non-legacy media peripheral was previously registered at a first location, a user identifier that was utilized during the prior registration may be acquired and utilized by the processor to facilitate current communication of the non-legacy media peripheral over the distributed media network. The acquired identifier may be authenticated by the processor prior to permitting the non-legacy media peripheral to access or communicate over the distributed media network. Subsequent to validating the acquired user identifier, the processor may also register the non-legacy media peripheral for operation at a second location. The processor may also be utilized to establish and register a user identifier that may be utilized to facilitate communication of the non-legacy media peripheral over the distributed media network.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for establishing secure access to a media peripheral in a home via a node in a communication network, the method comprising:
   acquiring by the node, security data associated with the media peripheral;
   searching by the node, for a previously acquired security data associated with a location of previous operation of the media peripheral;
   if said previously acquired security data is not found:
      communicating between the node and the media peripheral, information associated with the media peripheral, while the media peripheral is located in the home; and
   if said previously acquired security data is found:
      utilizing by the node, said acquired security data associated with the media peripheral and said previously acquired security data to facilitate secure communication between the media peripheral in the home and the communication network;
      acquiring at least one identifier associated with a location of previous operation of the media peripheral;
      validating said acquired at least one identifier based on said previously acquired security data, prior to communicating over the communication network; and
      if said acquired at least one identifier is valid, registering the media peripheral for subsequent operation while being located in the home.

2. The method according to claim 1, wherein said security data is a digital certificate.

3. The method according to claim 1, comprising reading said security data from the media peripheral.

4. The method according to claim 1, comprising transferring said security data to a media exchange server coupled to the communication network.

5. The method according to claim 1, comprising authenticating said acquired security data prior to said searching.

6. The method according to claim 1, comprising, if said previously acquired security data is not found, establishing at least one identifier to facilitate communication of the media peripheral over the communication network, wherein said at least one identifier is associated with the home; and
   registering the media peripheral for operation in the home, based on said established at least one identifier.

7. The method according to claim 1, wherein the communicated information comprises a previously established password.

8. A system for establishing secure access to a media peripheral in a home via a node in a communication network, the system comprising:
   at least one processor for use within the node, said at least one processor operable to acquire security data associated with the media peripheral;
   said at least one processor operable to search for a previously acquired security data associated with a location of previous operation of the media peripheral;
   said at least one processor operable to communicate between the node and the media peripheral, information associated with the media peripheral, while the media peripheral is located in the home, if said previously acquired security data is not found;
   said at least one processor operable to utilize said acquired security data associated with the media peripheral and said previously acquired security data to facilitate secure communication between the media peripheral in the home and the communication network, if said previously acquired security data is found;

said at least one processor operable to acquire at least one identifier associated with a location of previous operation of the media peripheral;

said at least one processor operable to validate said acquired at least one identifier based on said previously acquired security data, prior to communicating over the communication network; and said at least one processor operable to register the media peripheral for subsequent operation while being located in the home.

9. The system according to claim 8, wherein said security data is a digital certificate.

10. The system according to claim 8, wherein said at least one processor is operable to read said security data from the media peripheral.

11. The system according to claim 8, wherein said at least one processor is operable to transfer said security data to a media exchange server coupled to the communication network.

12. The system according to claim 8, wherein said at least one processor is operable to authenticate said acquired security data prior to said searching.

13. The system according to claim 8, wherein, if said previously acquired security data is not found, said at least one processor is operable to:

establish at least one identifier to facilitate communication of the media peripheral over the communication network, wherein said at least one identifier is associated with the home; and register the media peripheral for operation in the home, based on said established at least one identifier.

14. The system according to claim 8, wherein the communicated information comprises a previously established password.

15. The system according to claim 8, wherein said at least one processor is one or more of a computer processor, a media peripheral processor, a media exchange system processor and/or a media processing system processor.

* * * * *

UNITED STATES PATENT AND TRADEMARK OFFICE
CERTIFICATE OF CORRECTION

PATENT NO. : 7,584,359 B2  
APPLICATION NO. : 10/675652  
DATED : September 1, 2009  
INVENTOR(S) : Karaoguz et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1248 days.

Signed and Sealed this

Fourteenth Day of December, 2010

David J. Kappos  
*Director of the United States Patent and Trademark Office*